United States Patent
Hall et al.

(10) Patent No.: US 8,428,310 B2
(45) Date of Patent: Apr. 23, 2013

(54) PATTERN CLASSIFICATION SYSTEM AND METHOD FOR COLLECTIVE LEARNING

(75) Inventors: Stewart E. Hall, Wellington, FL (US); David M. Salcedo, Lake Worth, FL (US)

(73) Assignee: ADT Services GmbH, Neuhausen am Rheinfall (CH)

( * ) Notice: Subject to any disclaimer, the term of this patent is extended or adjusted under 35 U.S.C. 154(b) by 1337 days.

(21) Appl. No.: 12/038,918

(22) Filed: Feb. 28, 2008

(65) Prior Publication Data

US 2009/0220153 A1    Sep. 3, 2009

(51) Int. Cl.
*G06K 9/00* (2006.01)
*G06F 21/00* (2006.01)
*G05B 19/00* (2006.01)

(52) U.S. Cl.
USPC ........... 382/115; 382/116; 382/117; 382/118; 382/124; 713/186; 340/5.52; 340/5.53

(58) Field of Classification Search .................. 382/103, 382/181, 190–208, 115–127; 348/169; 713/186; 340/5.52, 5.53
See application file for complete search history.

(56) References Cited

U.S. PATENT DOCUMENTS

| | | | |
|---|---|---|---|
| 7,319,479 B1 | 1/2008 | Crabtree et al. | |
| 7,876,928 B2* | 1/2011 | Ito et al. | 382/115 |
| 2002/0105578 A1* | 8/2002 | Hunter | 348/169 |
| 2004/0036574 A1* | 2/2004 | Bostrom | 340/5.82 |
| 2004/0156530 A1* | 8/2004 | Brodsky et al. | 382/103 |
| 2004/0252194 A1* | 12/2004 | Lin | 348/169 |
| 2006/0098880 A1* | 5/2006 | Montgomery | 382/235 |
| 2007/0094720 A1* | 4/2007 | Galambos | 726/9 |
| 2007/0146484 A1* | 6/2007 | Horton et al. | 348/159 |
| 2007/0238444 A1* | 10/2007 | Bunn et al. | 455/411 |
| 2007/0247979 A1* | 10/2007 | Brillon et al. | 369/30.06 |
| 2008/0013789 A1* | 1/2008 | Shima et al. | 382/104 |
| 2008/0059331 A1* | 3/2008 | Schwab | 705/27 |
| 2008/0147557 A1* | 6/2008 | Sheehy | 705/58 |
| 2008/0177576 A1* | 7/2008 | Jennings et al. | 705/3 |
| 2008/0211907 A1* | 9/2008 | Kelly et al. | 348/143 |

FOREIGN PATENT DOCUMENTS

| | | |
|---|---|---|
| WO | 2004045215 A1 | 5/2004 |
| WO | 2006089776 A1 | 8/2006 |

OTHER PUBLICATIONS

Bramberger et al., "Integrating multi-camera tracking into a dynamic task allocation system for smart cameras," IEEE Conf on AVSS, Sep. 2005.*
Hu et al., "Principal axis-based correspondence between multiple cameras for people tracking," IEEE Transactions on Pattern Analysis and Machine Intelligence, Apr. 2006.*
International Search Report and Written Opinion dated Aug. 21, 2009 for International Application No. PCT/US2009/000296, International Filing Date Jan. 16, 2009 consisting of 11-pages.

(Continued)

*Primary Examiner* — Anand Bhatnagar
*Assistant Examiner* — Soo Park
(74) *Attorney, Agent, or Firm* — Alan M. Weisberg; Christopher & Weisberg, P.A.

(57) ABSTRACT

A method for configuring a pattern recognition system begins by receiving object recognition data from at least one first local image processing system. The object recognition data is stored in at least one global database. Configuration data is determined for a second local image processing system based at least in part upon the received object recognition data from the at least one first image processing system, and then transmitted to the second local image processing system.

22 Claims, 5 Drawing Sheets

OTHER PUBLICATIONS

Zajdel et al., "Gaussian Mixture Model for Multi-sensor Tracking," Proceedings of the Belgium-Netherlands Conference on Artificial intelligence, pp. 371-378, (Oct. 1, 2003), (XP002311883).

Pasula et al., "Tracking many Objects with many Sensors," Proceedings of the International Joint Conference on Artificial Intelligence, vol. 2, pp. 1160-1167, (Jul. 31, 1999), (XP008088784).

Zajdel et al., "Online Multicamera Tracking with a Switching State-Space Model," Pattern Recognition, (2004), ICPR 2004, Proceedings of the 17th International Conference on Cambridge, UK (Aug. 23-26, 2004), Piscataway, NJ USA, IEEE, vol. 4, (Aug. 23, 2004), pp. 339-343, (XP010723930 and ISBN: 978-0-7695-2128-2).

Zajdel et al., "A Sequential Bayesian Algorithm for Surveillance with Nonoverlapping Cameras," International Journal of Pattern Recognition and Artificial Intelligence, World Scientific Publishing, Singapore, SI, vol. 19, No. 8, pp. 977-996 (Dec. 1, 2005), (XP001238394 and ISSN: 0218-0014).

Zajdel et al., "Approximate Learning and Inference for Tracking with Non-overlapping Cameras," Proceedings of the Conference on Artificial Intelligence and Applications, (Sep. 1, 2003), pp. 70-75 (XP002311884).

* cited by examiner

PATTERN CLASSIFICATION SYSTEM AND METHOD FOR COLLECTIVE LEARNING

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for pattern recognition, and more specifically, to a method and system for collecting and compiling data from a plurality of local pattern recognizing systems to adapt to changes in the local environment and to configure other local systems installed in similar environments.

BACKGROUND OF THE INVENTION

Pattern recognition systems have been contemplated for many years and have gained acceptance for some applications. However, one of the major obstacles that stand in the way of wider acceptance and use is the difficulty in installing, configuring and maintaining these systems. Potential customers often elect not to implement these systems because the setup and configuration procedures are simply too complicated to be cost effective. This difficulty stems from the fundamental issue that pattern classification systems are only as accurate as the information used to set up the classifier.

Pattern classification systems are designed to match patterns of data that are acquired by sensors to an existing classification database or "training set." The training set is programmed into the device to provide a wide variety of examples of patterns that belong to one or more object classes that are to be recognized. When a pattern of data matches the training set to within a certain accuracy the detected data is classified to belong to certain class. The ability of the pattern recognition systems to accurately classify measured data is dependent on the size and diversity of the training set. Unfortunately, while designing a classification system, it is often difficult to predict the variations of data that the system will measure. For example, actual variations in the members of the class, variations in the measurements from sensor inaccuracies, sensor noise, system setup variations, system noise, and variations in the environment or environmental noise may differ for each system installed in the field.

Due to these variations, pattern recognition systems often incorporate the ability to adapt to new classification data via supervised or unsupervised learning. This adaptive ability allows the training set to be expanded to include new data acquired after the initial installation. In addition, new training data is often extracted from these "field trained" devices and manually included in future installations of pattern recognition systems.

However, there are several fundamental problems associated with this approach. For example, if the system is static, i.e. does not use an adaptive classification algorithm with learning, it cannot adapt to actual variations associated with its local environment such as variations in the members of the class, variations in the measurements due to sensor inaccuracies, sensor noise, system setup variations, system noise, variations in the environment or environmental noise, etc.

On the other hand, if the system uses an adaptive classification algorithm that relies on unsupervised learning, the sensor designer has limited control of the end state of the classification training set. This lack of control has the undesired effect that individual sensors will perform differently under identical conditions due to the non-deterministic characteristics of learning associated with different data being "learned" by each device. Systems that rely on these unsupervised approaches also require additional computing resources and power at the device.

If the system uses an adaptive algorithm that relies only on supervised learning, the designer or installer is forced to supervise the training of each device in the field to adapt to the new conditions. Thus, the installer must simulate as many variations in the classification members and environmental variations as possible to train the system. This approach is often impractical and validates customers' complaints concerning the complexity of the system.

To overcome many of the above deficiencies, system designers often attempt to minimize variations by specifying high quality components which increases the cost of the system. For example, high quality sensors minimize sensor bias and noise; expensive hardware filters minimize sensor, system and environmental noise; high speed processors may implement complex software filters, and execute feature extraction and complex classification algorithms; and large amounts of system memory may store a large training set, allowing for as many anticipated variations in the actual class members as possible, as well as variations in environmental conditions.

Additionally, the system is usually equipped with high bandwidth data port connections to allow installers to monitor sensor data directly during installation and to assist in the supervised training of the devices. In the event that the environmental conditions change, the system performance will often be affected, causing the installer to retune the system.

If the end-customer requests a change to the system's operation, such as recognition of a new class of objects or data, the designer must create a new classification training set and installer must repeat the installation procedure to tune the system with the new class members.

Therefore, what is needed is a system and method for collecting and compiling pattern recognition data from multiple local image processing systems such that the collected data can be used to update the local processing system to allow for changes in the environment and to configure and update additional image processing systems.

SUMMARY OF THE INVENTION

The present invention advantageously provides a method and system for configuring and updating local image processing systems of a collective learning pattern recognition system. Generally, the present invention uses information collected from local image processing systems in the collective learning pattern recognition system to automatically configure and update other local image processing systems located in similar environments.

One aspect of the present invention includes a method for configuring a pattern recognition system, by receiving object recognition data from at least one first local image processing system and storing the object recognition data in at least one global database. Configuration data for a second local image processing system, based at least in part upon the object recognition data received from the at least one first local image processing system, is determined and transmitted to the second local image processing system.

In accordance with another aspect, the present invention provides a method for configuring a pattern recognition system is disclosed which transmits a first set of system parameters to a centralized expert pattern recognition system. In response, configuration data, based at least in part upon the first set of system parameters and object recognition data collected from at least one other local image processing system, is received from the centralized expert pattern recognition system.

In accordance with still another aspect, the present invention provides a pattern recognition system in which there is at least one local image processing system and at least one centralized expert pattern recognition system communicatively coupled to each of the at least one local image processing system. The at least one centralized expert pattern recognition system receives object recognition data from at least a first one of the local image processing systems and stores the object recognition data in at least one global database. The centralized pattern recognition system then determines configuration data for a second local image processing system, based at least in part upon the object recognition data received from the at least one first local image processing system, and transmits the configuration data to the second local image processing system.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
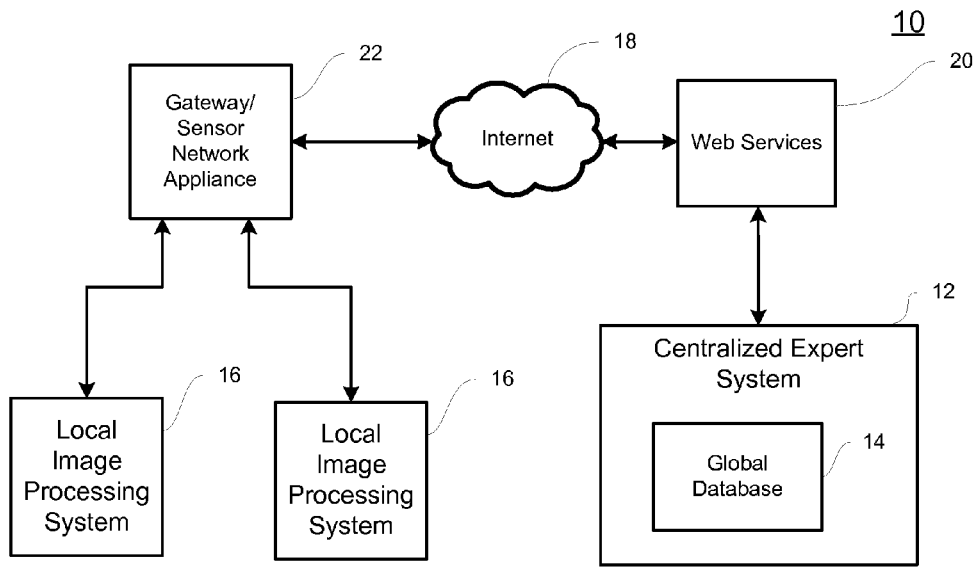
FIG. 1 is a block diagram of an exemplary collective learning pattern recognition system constructed in accordance with the principles of the present invention.

Before describing in detail exemplary embodiments that are in accordance with the present invention, it should be observed that the embodiments reside primarily in combinations of apparatus components and processing steps related to implementing a system and method for collecting and compiling pattern recognition data from multiple edge devices and using the collected data to configure and update additional edge devices. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The term "sensor data" includes data received from any sensor including, but not limited to, an image sensor.

One embodiment of the present invention includes a video and/or data pattern recognition and classification system that incorporates a low complexity, low cost architecture within a local image processing system or edge device. The local system communicates with a higher complexity centralized expert system that provides learning assistance to the low complexity local system. The information sent from the low complexity edge device may include, but is not limited to, images captured by the optical sensor, other sensor data and the device ID number. The expert system uses its knowledge of the edge device hardware, software and local data to confirm classification outcomes and to arbitrate non-classifiable outcomes. The expert system may update the classification and feature extraction algorithms used by the low complexity device as needed.

Additionally, the expert system may collect data from many low complexity edge devices and use this information to improve its global knowledge of system effectiveness. The expert system may then learn the best algorithms and classification techniques to be used for each installation of the edge devices. This information allows newly installed low complexity edge devices to benefit from the knowledge of previously installed devices. Upon installation, the installer may reference the environmental characteristics of an installation to pre-select preferred algorithms that a low complexity edge device may be programmed with as it registers on the network, enabling the edge device to incorporate knowledge gained by devices previously installed in similar environments as a starting point prior to post installation training. Such a system may be used in conjunction with or as part of a security system.

Referring now to the drawing figures in which like reference designators refer to like elements, there is shown in FIG. 1, a collective learning pattern recognition system constructed in accordance with the principles of the present invention and designated generally as "10." System 10 includes a centralized expert system 12 which may contain global pattern recognition databases 14 constructed from information received from a plurality of local image processing systems 16 (two shown). The centralized expert system 12 communicates with the local image processing systems 16 over the Internet 18 or other communication network, directly or indirectly using, for example, web services 20. Information is routed to and from each local image processing system 16 directly or through a gateway or sensor network appliance 22.

Figure 2:
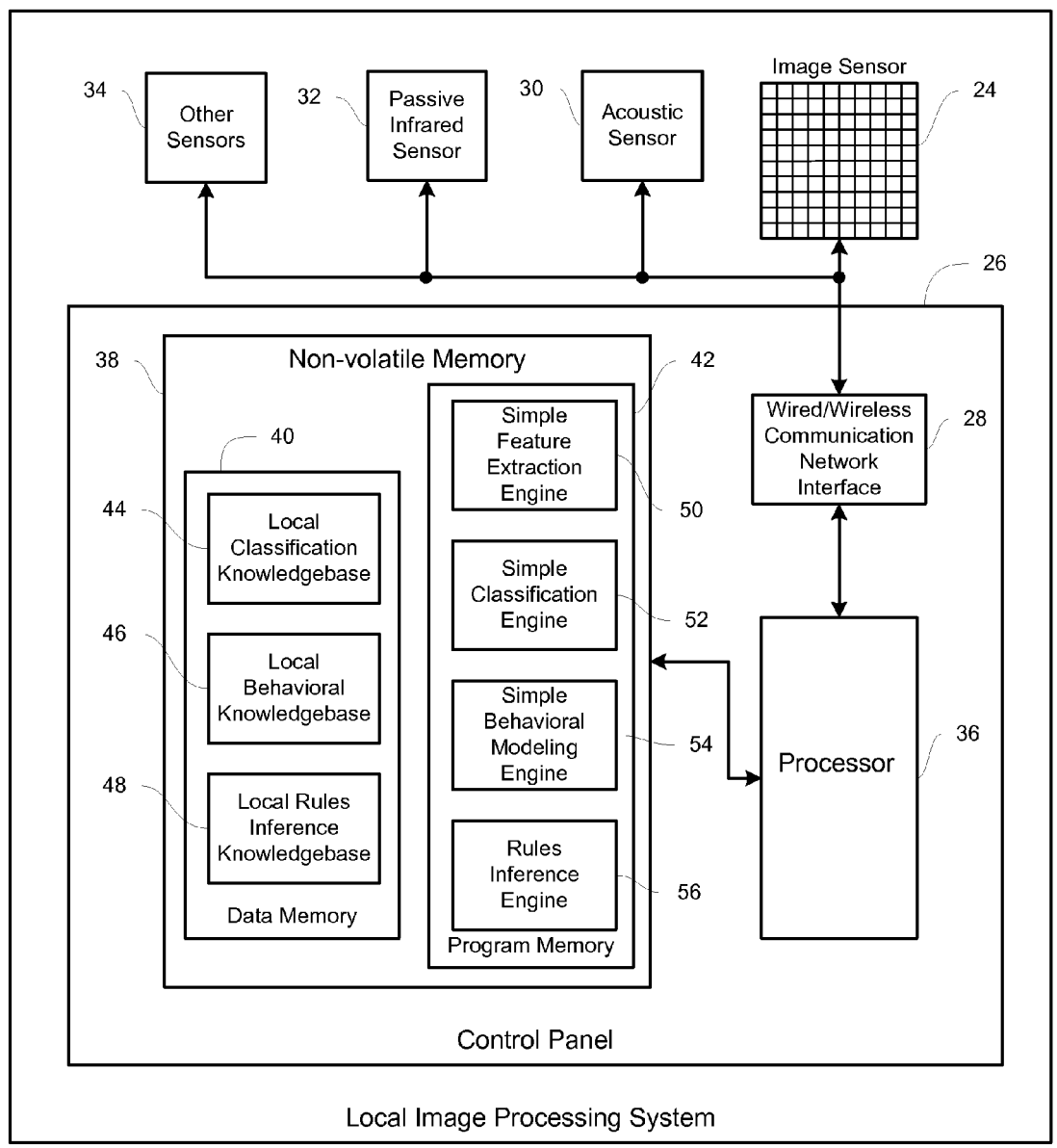
FIG. 2 is a block diagram of an exemplary local image processing system constructed in accordance with the principles of the present invention.

FIG. 2 depicts a block diagram of an exemplary local image processing system 16 constructed in accordance with the principles of the present invention. An image sensor 24 captures video image data and transfers this information to a local control panel 26. Protocols for wired or wireless data communication, such as TCP/IP, are known. The local control panel 26 receives video data from the image sensor 24 using a network communication interface 28, which may be wired, wireless, or a combination of wired and wireless devices. The local control panel 26 may also receive auxiliary information from acoustic sensors 30 (one shown), passive infrared sensors 32 (one shown), and a variety of other sensors 34 to aid in determining recognizable patterns with greater accuracy. For example, activation of an alert from an acoustic sensor 30 may trigger the local image processing system 16 to begin capturing and processing image data. The image sensor 24, acoustic sensor 30, passive infrared sensor 32 and other sensors may be co-located with the control panel 26 in a single, low-complexity edge device or remotely located but within communication range of the control panel 26.

The exemplary control panel 26 may also include a processor 36, which supervises and performs the various functions of the control panel including those described herein. The processor 36 is communicatively coupled to the communication interface 28 and a non-volatile memory 38. The non-volatile memory 38 may include a data memory 40 and a program memory 42. The data memory 40 and program memory 42 may contain local versions of databases and executable pattern recognition routines to be used solely for pattern recognition within the local image processing system 16. The data memory 40 may include local databases for pattern recognition and classification such as a local classification knowledgebase 44, a local behavior knowledgebase 46, and a local rules inference knowledgebase 48. The program memory 42 may include a simple feature extraction engine 50, a simple classification engine 52, a simple behavioral modeling engine 54 and a rules inference engine 56.

The local databases 44, 46, 48 and local pattern recognition routines 50, 52, 54, 56 may be periodically updated and modified according to information received from the centralized expert system 12. Each pattern recognition routine may be called, as needed, by the processor 36 for processing image datasets. For example, the simple feature extraction engine 50 extracts salient feature data included in image datasets collected from the image sensor 24. The simple classification engine 52 uses the local classification knowledgebase 44 to classify and determine the object class of each salient feature set. The simple behavior modeling engine 54 tracks the objects within the field of view of the image sensor 24 over a period of time to classify the behavior of the objects over time to create models of the behaviors of objects, and stores these models in the local behavior knowledgebase 46. The simple rules inference engine 56 compares the identified behavior to a set of behavior rules contained in the local rules inference knowledgebase 48 to determine if an alarm condition exists.

Figure 3:
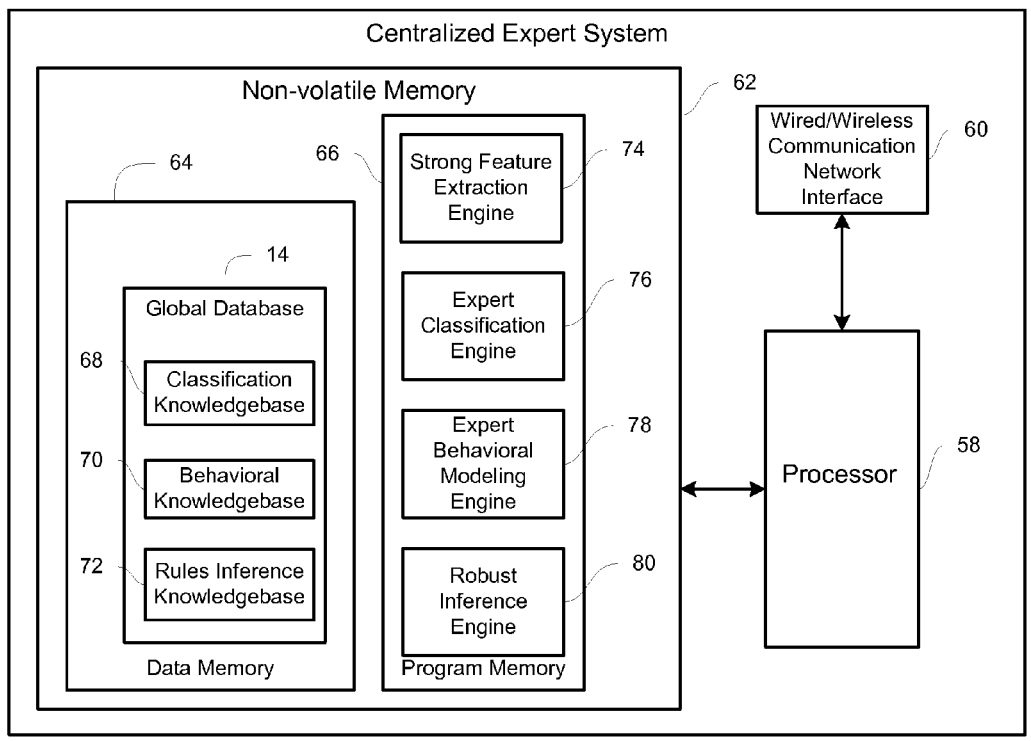
FIG. 3 is a block diagram of an exemplary centralized expert system constructed in accordance with the principles of the present invention.

FIG. 3 illustrates a block diagram of an exemplary centralized expert system 12. The expert system 12 may contain a processor 58 for controlling the functions of the centralized expert system, communicatively coupled to a wired or wireless network communication interface 60 for maintaining communications with local image processing systems 16. The processor 58 is communicatively coupled to a non-volatile memory 62 containing a data memory 64 and a program memory 66. The data memory 64 may include extensive databases, e.g., a global classification knowledgebase 68, a global behavioral knowledgebase 70, and a global rules inference knowledgebase 72, which contain information collected and compiled from every local image processing system within the entire pattern recognition system 100. These global databases 68, 70, 72 are similar to the corresponding local databases 44, 46, 48 but are generally much larger and more extensive. The centralized expert system 12 also has the ability to increase the global databases 68, 70, 72 based on new data received from each local image processing system 16. Additionally, the program memory 66 may contain advanced pattern recognition and classification routines, e.g. a strong feature extraction engine 74, an expert classification engine 76, an expert behavioral modeling engine 78, and a robust inference engine 80, which are similar to the corresponding local pattern recognition and classification routines 50, 52, 54, 56, respectively, but generally more complicated, requiring more processing capabilities.

Figure 4:
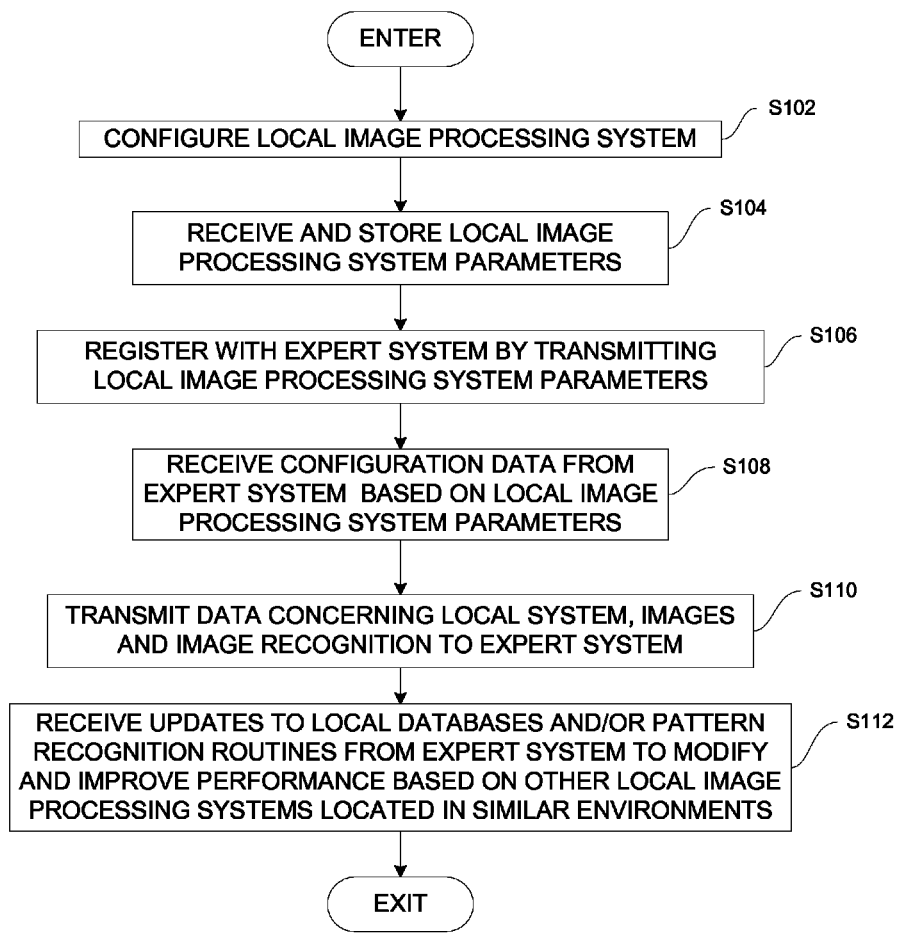
FIG. 4 is a flowchart of a local image processing system configuration process according to the principles of the present invention.

Referring to FIG. 4, an exemplary operational flowchart is provided that describes steps performed by a local image processing system 16 for using pattern recognition data collected from a plurality of local image processing systems by a centralized expert system 12 to configure and update the local image processing system 16. The process begins when an installer installs (step S102) a local image processing system 16 at a specific location. The installer enters installation parameters which are received and/or stored by the local image processing system 16 (step S104). The installation parameters may include such characteristics as the location of the system, e.g., ABC Corp. Store #456, Front Entrance; the desired functionality, e.g., traffic monitoring, people counting, intrusion detection, etc., and general environmental characteristics, e.g., indoor vs. outdoor, windows vs. non-windows, carpeted floors vs. tile floors, etc. The local image processing system 16 then registers itself with the centralized expert system 12 (step S106), for example, upon connecting to a network and establishing communication with the centralized expert system 12. The local image processing system 16 may register, for example, by transmitting local image processing system parameters, including a device or system ID and one or more other installation parameters, to the expert system 12.

The local image processing system 16 receives configuration data from the expert system 12 (step S108) which is customized for the specific local image processing system based on the received system parameters. The configuration data may include updated algorithms for feature extraction, classification, behavior modeling and rules inference designed specifically for local systems having the received system parameters.

After the local image processing system 16 has been configured, it begins collecting and analyzing image data. The low complexity (as compared generally with the centralized expert system 12) local image processing system 16 transmits a system or device ID, and one or more of the following data to the expert system 12 for analysis: images, transformed representations of images, feature vectors, sensor data, results of feature extraction algorithms, results of classification algorithms, results of behavior modeling and results of rules inference decisions (step S110). The sensor data transmitted from the local image processing system 16 can be low bandwidth data containing a reduced set of the full dataset captured by the local image processing system 16. For example, the data sent by the local image processing system 16 may contain only the salient information needed by the expert system 12 to classify and recognize image patterns. U.S. patent application Ser. No. 12/023,651, to Stewart E. Hall, filed Jan. 31, 2008 and entitled "Video Sensor and Alarm System with Object and Event Classification," discloses one method of extracting salient features from image data using low complexity end devices and is hereby incorporated by reference.

The local image processing system 16 may then receive updates to its local databases, e.g., local classification knowledgebase 44, local behavioral knowledgebase 46, local rules inference knowledgebase 48, and/or pattern recognition routines, e.g., simple feature extraction engine 42, simple classification engine 52, simple behavioral modeling engine 54, rules inference engine 56, from the expert system 12 to modify and improve its performance (step S112). The updated databases and/or pattern recognition routines may be based on data collected and learned from other local image processing systems located in similar environments.

Figure 5:
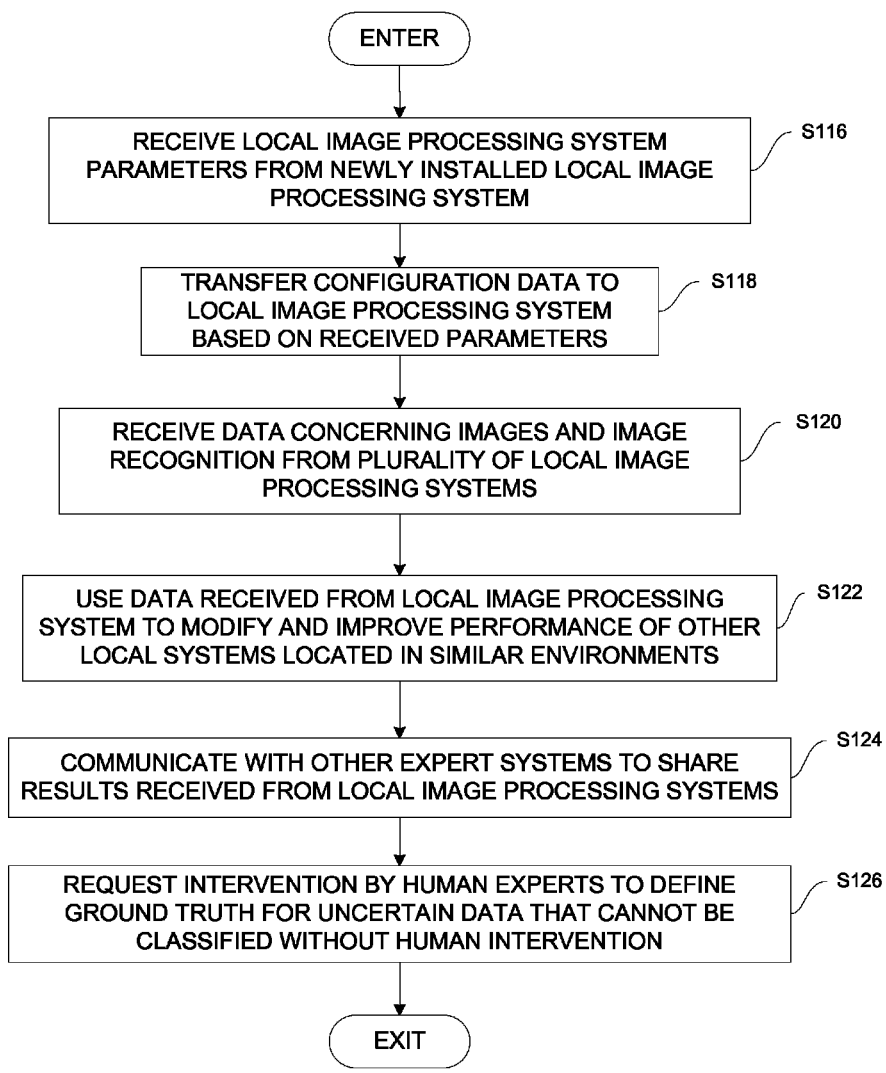
FIG. 5 is a flowchart of a pattern recognition data collection process performed in accordance with the principles of the present invention.

FIG. 5 is an exemplary operational flowchart describing the process performed by a centralized expert system 12 to collect and compile pattern recognition data from multiple local image processing systems 16, and to use the collected data to configure and update additional image processing systems. In operation, the centralized expert system 12 receives registration data including local image processing system parameters from a newly installed local image processing system 16 (step S116). The expert system 12 analyzes the received local image processing system parameters and transfers configuration data back to the local image processing system 16 based on the received parameters (step S118). The configuration data may include updates to local databases and/or algorithms for feature extraction, classification, behavior modeling and rules inference.

The expert system 12 then receives data concerning images and image/object recognition compressed or transformed representations of images, and other sensor data. The data may be used to evaluate the characteristics of the background image, e.g., variations of the background image lighting, motion within the image, variations in sensor data, etc. The data may also contain features and objects to be classified in order to evaluate the effectiveness of the local image processing system's pattern recognition algorithms.

The expert system 12 may also receive direct output of the local image processing system's feature extraction engine 42, the classification engine 52, the behavior modeling engine 54 and/or the rules inference engine 56. The expert system 12 may then use the data received from individual local image processing systems 16 to modify and improve the performance of a group of local image processing systems that are in similar environments or used for similar tasks, i.e. local image processing systems having at least one common system parameter (step S122).

Figure 6:
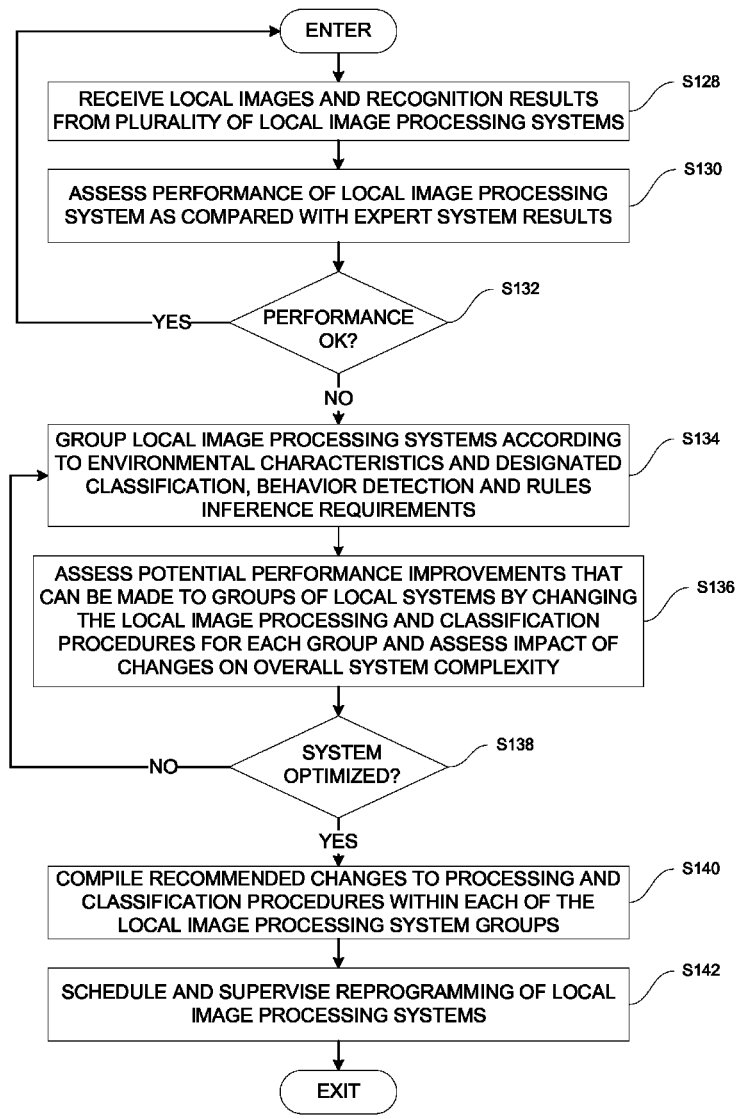
FIG. 6 is a flow chart of an image processing system optimization process performed in accordance with the principles of the present invention.

This data may also be used to evaluate and verify the effectiveness of the local image processing algorithms and to determine if changes to these algorithms are needed. For example, as shown in FIG. 6, the expert system 12 receives recognition results based on at least one pattern recognition algorithm from at least one local image processing system 16, e.g., feature extraction engine 50, classification engine 52, behavior modeling engine 54, and rules inference engine 56, as well as the original corresponding image data (step S128). The expert system 12 may then assess the performance of the local image processing system 16 by executing its own corresponding pattern recognition algorithm (step S130), e.g., strong feature extraction engine 74, expert classification engine 76, expert behavior modeling engine 78, and robust rules inference engine 80 on the original image data and comparing the results to the output results received from the local image processing system 16. If the performance is deemed satisfactory (step S132), the expert system 12 takes no other action and simply waits to receive additional results. However, if there are any discrepancies in the data, the expert system 12 may determine that the local image processing system 16 needs to be updated.

The expert system 12 performs a system optimization by grouping local image processing systems 16 according to local environmental characteristics and designated classification, behavior detection and rules inference requirements (step S134). The expert system 12 then assesses potential performance improvements that can be implemented on groups of local image processing systems 16 by changing the local image processing and classification procedures for each group (step S136). The expert system 12 also assesses the impact of changes on the overall system complexity and determines if the system 16 is optimized. If the overall system 16 is not optimized (step S138), the expert system returns to step S134 and continues the optimization procedures. If the overall system 16 is optimized (step S138) the expert system 12 compiles recommended changes to processing and classification procedures within each of the local image processing system groups (step S140). The recommended changes may optionally require approval from a system administrator prior to implementation.

The expert system 12 schedules and sends updates to the local image processing system 16 containing improved pattern recognition algorithms and/or training set databases (step S142). This collective learning capability by the expert system 12 is an advantageous feature of the present invention.

Returning to FIG. 5, the expert system 12 may also communicate (step S124) with other expert systems (not shown) to share the results that received from edge devices, i.e. local image processing systems. Additionally, the expert system 12 may request (step S126) and/or receive intervention by human experts to define the ground truth for uncertain data that cannot be classified without human intervention. This feature enhances the learning capability of the expert system 12, which is then seamlessly passed down to local image processing systems 16 without requiring human intervention at each local site.

An advantage of the present invention over the prior art is the ability to program and re-program similar local image processing-based systems as a single group. For example, most chain retail department stores are designed to have a certain similar look and feel for each store. Thus, local image processing systems 16 located in each store are necessarily situated in similar environments. Installation of new systems in new stores is exceedingly simple. An installer begins with a basic set of parameters determined by known qualities such as the location, e.g., name of store chain, and specific features, e.g. carpet, indoors, of the installation site. The expert system merely has to learn one location and may assume that other local systems having similar parameters are the same, e.g., all Store "X" fronts are the same. This group learning allows an expert system to "pre-learn" a location before a local system is even installed. Once active, the system learns other specific characteristics of the local system, such as lighting, needed for accurate detection. All the local systems are able to reap the benefit of adaptive knowledge learned from each individual system.

Optimization of local system performance comes at the expense of system complexity—with each local image processing system having the potential to have a different decision making process from its neighbor. To simultaneously optimize system performance and system complexity, the expert system may group local devices with similar operational characteristics and program all members of the group with identical decision making processes. This is done at the expense of individual device performance. Once an optimized grouping of devices is determined, the expert system uses this optimized system configuration to provide new training data to each of the local devices as needed to improve operation of the overall system. In addition, the expert system then modifies the base state of instructions and training data that it will provide to new devices that will register in the future so that the "experiences" of the individual local devices that were incorporated into collective global knowledge base can be immediately used without the need for each new device to learn on its own.

Additionally, local systems may be reprogrammed as a group, rather than on an individual basis. For example, all employees of Store "X" stores wear the same color vests. Supposing Store "X" decided it wanted to track the number of employees on the floor at any given time, all local image processing systems belonging to Store "X" could be reprogrammed simultaneously to begin tracking the number of people identified as wearing a certain color vest.

An embodiment of the present invention utilizes an adaptive approach that allows for changes in the local image processing system or edge device algorithms so that the local system can be changed to adapt to actual variations in class members or to variations in the measurement data caused by the sensor inaccuracies, sensor noise, system setup variations, system noise, variations in the environment or environmental noise. However, the changes to the local systems are supervised by a centralized expert system to minimize the variations and uncontrolled learning that can occur with unsupervised learning.

Because the present invention uses an adaptive training algorithm that is supervised by an expert system and ultimately controlled by a human operator, the local system can be installed without the need for extensive training at the time of installation. Because the edge devices are continuously evaluated for accuracy, there is no need to anticipate all of the variations that the edge devices may encounter. Because the expert system can collect data from many local systems, it is possible to use the training data from previous installations to use in the initial setup of new installs.

Additionally, if environmental conditions should change the local system performance, the expert system may compensate for many of these changes without the need for the installer to retune the local system. For newly requested changes to the systems operation, such as recognition of a new class of objects or data, a new classification training set may be developed and upgraded remotely without the need for an installer to retrain each of the edge devices.

Alternative embodiments may eliminate the behavior modeling or rules inference engine if not needed. Additionally, the functionality of blocks may be combined together without changing the basic idea of the invention.

In summary, in accordance with the principles of the present invention, "experience" is collected locally, while learning is accomplished globally. Local databases allow fast operation without transfer of information or decision making to the global level. But any learning, i.e. changes to the decision making process, is done at the expert system level. These changes to the decision making process are accomplished by the expert system changing the local databases on one or more local devices.

Although the embodiments discussed herein have focused primarily on the use of video pattern classification, it is expected that data from other sensors may be substituted for video sensors or used in addition to the video sensors without changing the overall concept of the invention. The present invention may be used for many applications where a low cost, low complexity edge device can be used to classify data and provide useful information based on the classification of that data. Some examples include people counting, line management, shopper tracking in retail, cart tracking, vehicle tracking, human recognition, adult vs. child detection, etc.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for adaptive learning in a pattern recognition system, the method comprising:
   receiving image data and local object recognition data from at least one first local image processing system, the local object recognition data based on a at least one first local classification algorithm;
   storing the object recognition data in at least one global database, the at least one global database associated with a centralized expert system;
   analyzing the image data using at least one expert system classification algorithm;
   determining accuracy of the first local classification algorithm based on analysis by the at least one expert system classification algorithm; and
   transmitting an update to the at least one first local classification algorithm to improve the accuracy thereof.

2. The method of claim 1 wherein the configuration data includes at least one of an update to a local image processing system database, a feature extractor, an object classifier, a behavior modeling engine, and a rules inference engine.

3. The method of claim 1 wherein the object recognition data includes at least one of images, compressed representations of images, transformed representations of images, sensor data, salient features, classification objects, output from a behavior modeling engine and output from a rules inference engine.

4. The method of claim 1 wherein the global database includes at least one of a classification knowledgebase, a behavioral knowledgebase, and a rules inference knowledgebase.

5. The method of claim 1, further comprising:
   determining configuration data for a second local image processing system, the configuration data based at least in part upon the object recognition data received from the at least one first local image processing system; and
   transmitting the configuration data to the second local image processing system.

6. The method of claim 5, further comprising:
   receiving a first set of system parameters from the second local image processing system; and
   determining the configuration data based at least in part upon the first set of system parameters.

7. The method of claim 6 wherein the set of system parameters includes at least one of a device ID, a system ID, a location, a desired functionality and an environmental characteristic.

8. The method of claim 6, further comprising:
   receiving a second set of system parameters from the at least one first local image processing system wherein at least one parameter from the first set of system parameters received from the second local image processing system is the same as at least one parameter from the second set of system parameters received from the at least one first local image processing system.

9. The method of claim 1, further comprising:
   receiving image data from the at least one local image processing system;
   receiving a first pattern recognition dataset based upon a first pattern recognition algorithm;
   executing a second pattern recognition algorithm on the received image data to produce a second pattern recognition dataset;
   comparing the first pattern recognition dataset to the second pattern recognition dataset to reveal any discrepancies; and responsive to discovering discrepancies, transmitting updates to at least one of the first pattern recognition algorithm and a database of the at least one local image processing system.

10. A method for adaptive learning in a pattern recognition system, the method comprising:
transmitting image data from at least one local image processing system to a central expert system, the image data including a first pattern recognition dataset based upon a first pattern recognition algorithm, the central expert system performing the steps of:
executing a second pattern recognition algorithm on the received image data to produce a second pattern recognition dataset;
comparing the first pattern recognition dataset to the second pattern recognition dataset to reveal any discrepancies; and
responsive to discovering discrepancies, transmitting updates to at least one of the first pattern recognition algorithm and a database of the at least one local image processing system.

11. The method of claim 10 wherein the second pattern recognition algorithm is at least one of a feature extractor, an object classifier, a behavior modeler, and a rules inference engine.

12. The method of claim 11 wherein the second pattern recognition algorithm references the at least one global database to produce the second pattern recognition dataset.

13. A method of configuring a local image processing system, the method comprising:
transmitting a first set of system parameters to a centralized expert pattern recognition system; and
receiving configuration data from the centralized expert pattern recognition system, the configuration data including at least one local pattern recognition algorithm, the configuration data based at least in part on the first set of system parameters and object recognition data collected from at least one other local image processing system, the at least one other local image processing system including a second local pattern recognition algorithm, the central expert system determining the at least one local pattern recognition algorithm based at least in part on the first set of parameters and the second local pattern recognition algorithm.

14. The method of claim 13, further comprising:
capturing image data;
producing object recognition data using the received configuration data and the captured image data; and
transmitting the object recognition data to the centralized expert pattern recognition system, the centralized expert pattern recognition performing the steps of:
analyzing the object recognition data using at least one expert system classification algorithm,
determining accuracy of the at least one local pattern recognition algorithm based analysis by the at least one expert system classification algorithm, and
transmitting an update to the at least one local pattern recognition algorithm to improve the accuracy thereof.

15. A pattern recognition system comprising:
a plurality of local image processing systems, each of the plurality of local image processing systems collecting local image data and producing local object recognition data based on at least one local classification algorithm;
at least one centralized expert pattern recognition system communicatively coupled to each of the plurality of local image processing systems, the at least one centralized expert pattern recognition system:
receiving image data and local object recognition data from at least one of the local image processing systems;
analyzing the local image data using at least one expert system algorithm to produce expert object recognition data;
comparing the expert object recognition data with the local object recognition data to determine the accuracy of the at least one local classification algorithm; and
transmitting an update to the at least one local classification algorithm to improve the accuracy thereof.

16. The system of claim 15 wherein each local image processing system of the plurality of local image processing systems includes:
a communication interface;
an image capturing device for capturing video image data; and
a processor communicatively coupled to the communication interface and the image capturing device, the processor producing object recognition data from the captured image data.

17. The system of claim 16 wherein each local image processing system further includes at least one of a local object classification knowledgebase, a local behavioral knowledgebase, and a local rules inference knowledgebase.

18. The system of claim 16 wherein the configuration data includes at least one of an update to a local image processing system database, a feature extractor, an object classifier, a behavior modeling engine and a rules inference engine.

19. The system of claim 15 wherein the at least one centralized expert pattern recognition system includes:
a communication interface;
at least one global knowledgebase containing object recognition data received from the at least one local image processing system; and
a processor communicatively coupled to the communication interface and the at least one global knowledgebase, the processor:
compiling the received object recognition data; and
determining the configuration data of the second of the local image processing systems based on the received object recognition data.

20. The system of claim 15 wherein the centralized expert system further:
receives a set of system parameters from the second one of the local image processing systems; and
determines the configuration data based upon the set of system parameters.

21. The system of claim 15 wherein the plurality of local image processing systems includes a first local image processing system, and the centralized expert system determines configuration data for a second local image processing system based at least in part upon object recognition data received from the first local image processing system, and wherein the centralized expert system transmits the configuration data to the second local image processing system.

22. The system of claim 15, further comprising:
determining configuration data for a second local image processing system, the configuration data based at least part upon the object recognition data received from the at least one first local image processing system; and
transmitting the configuration data to the second local image processing system.

* * * * *